3,524,874
PROCESS FOR THE PRODUCTION OF
PHENYLACRYLONITRILES
Naoya Kominami, Tokyo, Hitoshi, Nakajima, Urawa-shi, and Takeo Kimura and Tokio Sakurai, Tokyo, Japan, assignors to Asahi Kasei Kogyo Kabushiki Kaisha, Osaka, Japan
No Drawing. Filed Dec. 20, 1967, Ser. No. 691,937
Claims priority, application Japan, Dec. 28, 1966, 42/85,418
Int. Cl. B01j 11/12; C07c 121/70, 121/72
U.S. Cl. 260—465    7 Claims

ABSTRACT OF THE DISCLOSURE

Process for the production of phenylacrylonitriles, comprising subjecting a gas mixture containing styrene or a derivative thereof, oxygen or a molecular oxygen-containing gas and hydrogen cyanide to a gas phase catalytic reaction at a temperature of from 100° to 500° C. in the presence of palladium, rhodium or one compound of palladium or rhodium.

---

This invention relates to a process for the production of phenylacrylonitriles by a gas phase catalytic reaction of styrene or a derivative thereof, hydrogen cyanide and oxygen.

Hitherto, there has been no commercial process according to which phenylacrylonitriles can be produced in a single stage directly from styrene or a derivative thereof, hydrogen cyanide and oxygen as starting materials.

It is an object of the present invention to provide a process according to which phenylacrylonitriles can be produced directly in a single stage by a catalytic reaction of styrene or a derivative thereof, hydrogen cyanide and oxygen.

Other objects and advantages will become apparent from the following description.

The present invention provides a process for producing phenylacrylonitriles of the formula:

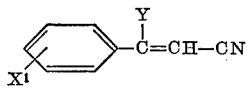

(wherein $X^1$ represents hydrogen atom, chlorine atom, cyano, vinyl, or —CH=CH—CN group; and Y represents hydrogen atom or methyl group), which comprises subjecting a gas mixture containing one member selected from the group consisting of styrene and derivatives thereof of the formula:

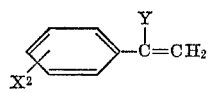

wherein $X^2$ represents hydrogen atom, chlorine atom, cyano, or vinyl group; and Y is the same as defined above), hydrogen cyanide and oxygen or a molecular oxygen-containing gas to a catalytic reaction at an elevated temperature in the presence of palladium, rhodium or one compound of palladium or rhodium as catalyst.

The phenylacrylonitriles according to the present invention may be identified by a combination of infrared absorption spectrum, nuclear magnetic resonance, elementry analysis, mass spectrometry and gas chromatography.

As the catalyst, palladium or rhodium can be used in the form of the metal or as compounds.

Examples of compounds of palladium and of rhodium which may be used are halides, such as chlorides, bromides and iodides, cyanides, oxides, hydroxides, sulfides, thiocyanates, carboxylates such as acetates, monochloroacetates and oxalates and inorganic acid salts such as sulfates, nitrates and phosphates.

It has been found valuable to utilize, as promoter, at least one compound of lithium, sodium, potassium, rubidium, cesium, magnesium, calcium, strontium, barium, zinc, cadmium, indium, copper, cerium, thorium, thallium, antimony, bismuth, chromium, molybdenum, manganese, iron, nickel, cobalt, tungsten and platinum when palladium or one compound of palladium is used as catalyst.

By utilizing these promoters, there have been observed such effects as to increase the yields of phenylacrylonitriles, to maintain the yields high for a long time and to inhibit the lowering in catalyst activity.

More precisely, the addition of the compounds of lithium, sodium, potassium, rubidium, cesium, magnesium, calcium, strontium, barium, zinc, cadmium or indium maintains the yields of phenylacrylonitriles high and prevents the lowering in catalyst activity. On the other hand, the addition of the compounds of cerium, thorium, thallium, antimony, bismuth, chromium, molybdenum, manganese, iron, nickel, cobalt, tungsten and platinum remarkably increases the catalyst activity in producing phenylacrylonitriles.

Examples of compound of lithium, sodium, potassium, rubidium, cesium, magnesium, calcium, strontium, barium, zinc, cadmium, copper, iron, nickel, cobalt, tungsten or platinum which may be used in the present invention are halides, cyanides sulfides, inorganic acid salts such as nitrates, sulfates, phosphates and borates, organic acid salts such as acetates and oxalates, hydroxides and oxides. Examples of compounds of indium, cerium, thorium, thallium, antimony, bismuth, chromium, molybdenum or manganese are halides, sulfides, inorganic acid salts such as nitrates and sulfates, organic acid salts such as acetates and oxalates, the other organic acid salts, hydroxides and oxides.

The atomic ratio of palladium to the metal in the above-described compounds as promoter is preferably in the range of 1:50–1/100.

When the reaction is effected in the presence of at least one hydrogen halide such as hydrogen chloride, hydrogen bromide and hydrogen iodide or one compound such as α-chloro-β-cyanoethylbenzene and β-chloroethylbenzene which may be decomposed to give hydrogen choride under the reaction conditions, the yields of the phenylacrylonitriles are increased and the lowering in catalyst activity is not observed and at the same time the formation of oxides such as carbon dioxide is inhibited, but the presence of the hydrogen halide or the said compound is not essential.

The catalyst may be prepared by any of the conventional methods such as immersing method, mixing or heating method. The use of a carrier is not essential but is preferable. The carrier may be any one that can be usually employed as carrier. Examples of carriers are silica gel, active carbon, alumina, silica-alumina, alumina-boria and molecular sieve.

The catalyst thus prepared may be used as such, but is desirably used after treatment with hydrogen sulfide to give a long catalytic life to the catalyst. The temperature at which the hydrogen sulfide treatment is conducted is preferably in the range of from 200° to 600° C.

The catalyst may be employed in the form of a fixed bed, moving bed or fluidized bed.

In practicing the process of this invention, some or complete lowering in catalyst activity may be observed. In such a case, the reaction is stopped and the catalyst is heated while introducing oxygen, a gas containing molecular oxygen such as air, one hydrogen halide or a mixture thereof, whereby the catalyst activity is easily restored. Examples of hydrogen halides are hydrogen chloride, hydrogen bromide and hydrogen iodide. This regeneration temperature is preferably in the range of from 200° to 600° C. and more preferably in the range of from 250° to 500° C. When one hydrogen halide is employed, the volume ratio of the hydrogen halide to oxygen is in the range of 20–1/1000:1. preferably 5–1/100:1.

The starting gas may be diluted with an inert gas or a relatively low reactive gas such as helium, nitrogen, carbon dioxide, carbon monoxide, methane, ethane or steam, but this is not essential.

The volume ratio of styrene or a styrene derivative to hydrogen cyanide is preferably in the range of 1:20–1/20, and the volume ratio of oxygen to hydrogen cyanide is preferably in the range of 10–1/20:1. When a hydrogen halide is employed, the volume ratio of hydrogen cyanide to the hydrogen halide is in the range of 1:20;1/100, preferably 1:5–1/10.

The temperature adopted in the present invention is in the range of from 100° to 500° C., preferably from 200° to 400° C.

The process of the present invention is carried out at atmospheric pressure, but may be carried out under super-atmospheric pressure.

The space velocity adopted in the present invention is preferably in the range of from 20 hr.$^{-1}$ to 20,000 hr.$^{-1}$.

The phenylacrylonitriles according to this invention are of value as intermediate for the production of aromatics or of polymers.

This invention will be illustrated by the following examples which are in no way limiting upon the scope hereof.

EXAMPLE 1

0.1 gram-mole of palladium chloride and 0.2 gram-mole of potassium chloride were supported on 500 g. of active carbon by the conventional immersion method. 2 g. of the resulting catalyst was mixed with 4 g. of quartz sand and filled into a reaction tube of 10 mm. inside diameter. The reaction tube was placed in a sodium nitrite and potassium nitrate bath (hereinafter referred to as "a niter bath") maintained at 250° C. Into the reaction tube a gas mixture consisting of styrene, hydrogen cyanide, oxygen, hydrogen chloride and nitrogen at a volume ratio of 5:5:5:1:34 was introduced at a flow rate of 100 NTP ml./min. The yield of phenylacrylonitrile was 22.7% based on the introduced styrene over 30 minutes after the starting of reaction and 22.6% over 5 hours after the starting of reaction.

EXAMPLE 2

0.2 gram-mole of cesium iodide and 0.1 gram-mole of palladium chloride were supported on 600 g. of silica gel by the conventional immersion method. I g. of the resulting catalyst was mixed with 2 g. of quartz sand and filled into a reaction tube of 10 mm. inside diameter. The reaction tube was maintained at 350° C. and a gas mixture consisting of styrene, hydrogen cyanide, oxygen, hydrogen chloride, nitrogen and carbon dioxide at a volume ratio of 2:1:1:1:1:1 was introduced at a flow rate of 100 NTP ml./min. The yield of phenylacrylonitrile was 24.0% based on the introduced styrene.

EXAMPLE 3

Using a catalyst prepared by supporting 0.5 gram-mole of potassium chloride, 0.05 gram-mole of zinc chloride and 0.1 gram-mole of palladium chloride on 600 g. of silica gel by the conventional immersion method, the reaction was carried out in the same manner as in Example 1. The yield of phenylacrylonitrile was 19.6% based on the introduced styrene over 30 minutes and over 50 hours after the starting of the reaction.

EXAMPLE 4

An aqueous solution containing 3.2 g. of rhodium nitrate was mixed into 50 g. of active carbon, and the mixture was evaporated to dryness on a hot water bath. 10 g. of this catalyst was mixed with 10 g. of quartz sand and filled into a reaction tube of heat-resistance glass of 15 mm. inside diameter. The reaction tube was placed in a niter bath maintained at 250° C. and a gas mixture consisting of styrene, hydrogen cyanide, oxygen, hydrogen chloride and nitrogen at a volume ratio of 5:5:5:1:24 was introduced at a flow rate of 50 NTP ml./min. The yield of phenylacrylonitrile was 7.5% based on the introduced styrene over 30 minutes after the starting of reaction and 6.5% over 5 hours after the starting of reaction. Over 5 hours after the starting of reaction, the process was stopped and air was introduced into the reaction tube at 250° C. at a flow rate of 50 NTP ml./min. for 3 hours. Subsequently a gas mixture of the same composition as above-described was introduced at a flow rate of 50 NTP ml./min. The yield of phenylacrylonitrile was 7.4% based on the introduced styrene over 30 minutes after the reopening of reaction.

EXAMPLE 5

0.2 gram-mole of rhodium bromide, rhodium hydroxide and rhodium oxalate was supported on 500 g. of active carbon, respectively, and 10 g. of the catalyst was mixed with 10 g. of quartz sand, respectively and the mixture was filled into a reaction tube, respectively. Each reaction tube was maintained at 300° C. and a gas mixture consisting of styrene, hydrogen cyanide, oxygen and nitrogen at a volume ratio of 1:1:1:7 was introduced at a flow rate of 50 NTP ml./min. The yield of phenylacrylonitrile was 6.3% in case of utilizing the rhodium bromide catalyst, 5.2% in case of utilizing the rhodium hydroxide catalyst and 6.5% in case of utilizing the rhodium oxalate catalyst, based on the introduced styrene respectively.

EXAMPLE 6

0.2 gram-mole of palladium iodide, palladium acetate, palladium oxide and palladium cyanide was supported on 600 g. of the silica gel, respectively, and 10 g. of the catalyst was mixed with 10 g. of quartz sand, respectively, and the mixture was filled into a reaction tube, respectively. Each reaction tube was maintained at 280° C., and a gas mixture consisting of styrene, hydrogen cyanide, oxygen, hydrogen chloride and nitrogen at a volume ratio of 2:1:1:1:5 was introduced at a flow rate of 50 NTP ml./min. The yield of phenylacrylonitrile based on the introduced styrene was 7.8%, 7.0%, 5.3% and 8.2% in case of utilizing the palladium iodide, palladium acetate, palladium oxide and palladium cyanide respectively.

EXAMPLE 7

1 g. of the catalyst prepared by supporting 0.1 gram-mole of barium chloride and 0.2 gram-mole of palladium chloride on 600 g. of silica gel by the immersion method was mixed with 2 g. of quartz sand, and the mixture was filled into a reaction tube of hard glass of 12 mm. inside diameter. The reaction tube was placed in a niter bath maintained at 380° C. A gas mixture consisting of chlorostyrene, hydrogen cyanide, oxygen and nitrogen at a volume ratio of 2:1:1:1 was introduced into the reaction tube at a flow rate of 100 NTP ml./min. The yields of chlorocinnamonitrile, cyanocinnamonitrile and cyanostyrene were 8.3%, 3.0% and 1.1% based on the introduced chlorostyrene, respectively.

EXAMPLE 8

An aqueous hydrochloric acid solution containing 4 g. of palladium chloride was mixed with 60 g. of silica gel, and the mixture was evaporated to dryness on a hot water bath. 10 g. of this catalyst was mixed with 10 g. of quartz sand and filled into a reaction tube of heat-resistant glass of 15 mm. inside diameter, and the reaction tube was placed in a niter bath maintained at 300° C. A gas mixture consisting of styrene, hydrogen cyanide, oxygen and nitrogen at a volume ratio of 3:1:1:5 was introduced at a flow rate of 50 NTP ml./min. The yield of phenylacrylonitrile was 5.2% based on the introduced styrene over 30 minutes after the starting of reaction and 3.1%, over 10 hours after the starting of reaction. Over 10 hours after the starting of reaction, the process was stopped and a gas mixture consisting of oxygen, hydrogen chloride and nitrogen at a volume ratio of 1:1:2 was introduced into the reaction tube at a flow rate of 30 NTP ml./min. for 5 hours, and subsequently a gas mixture of the same composition as above-described at a flow rate of 50 NTP ml./min. The yield of phenylacrylonitrile was 5.5%, based on introduced styrene over 30 minutes after the reopening of reaction.

EXAMPLE 9

2 g. of the catalyst prepared by supporting 0.2 gram-mole of cadmium chloride and 0.1 gram-mole of palladium chloride on 600 g. of silica gel by the immersion method was mixed with 4 g. of quartz sand and the mixture was filled into a reaction tube of 10 mm. inside diameter and the reaction tube was maintained at 230° C. A gas mixture consisting of styrene, hydrogen cyanide, oxygen, hydrogen chloride and nitrogen at a volume ratio of 2:1:1:1:1 was introduced at a flow rate of 100 NTP ml./min. The yield of phenylacrylonitrile was 9.0%, based on the introduced styrene, over 30 minutes after the starting of reaction and 9.0% over 5 hours after the starting of reaction, based on the introduced styrene.

EXAMPLE 10

Using a catalyst prepared by supporting 0.1 gram-mole of thallium chloride and 0.2 gram-mole of palladium chloride on 500 g. of active carbon by the immersion method, the reaction was carried out in the same manner as in Example 1. The yield of phenylacrylonitrile was 21.1%, based on the introduced styrene.

EXAMPLE 11

2 g. of the catalyst prepared by supporting 0.1 gram-mole of palladium chloride and 0.2 gram-mole of lithium chloride on 600 g. of silica gel by the immersion method was mixed with 4 g. of quartz sand, and the mixture was filled into a reaction tube of hard glass, and the reaction tube was placed in a niter bath maintained at 300° C. A gas mixture consisting of styrene, hydrogen cyanide, oxygen and methane at a volume ratio of 1:1:1:1 was introduced at a flow rate of 100 NTP ml./min. The yield of phenylacrylonitrile was 17.3%, based on the introduced styrene.

EXAMPLE 12

5 g. of the same catalyst as employed in Example 8 was mixed with 10 g. of quartz sand, and the mixture was filled into a reaction tube of hard glass of 15 mm. inside diameter, and the reaction tube was placed in a niter bath maintained at 280° C. A gas mixture consisting of styrene, hydrogen cyanide, oxygen, hydrogen chloride and nitrogen at a volume ratio of 3:1:1:1:4 was introduced at a flow rate of 50 NTP ml./min. The yield of phenylacrylonitrile was 8.5%, based on the introduced styrene and the same yield was obtained over 5 hours after the starting of reaction.

EXAMPLE 13

4 g. of the catalyst prepared by supporting 0.1 gram-mole of magnesium chloride and 0.1 gram-mole of palladium chloride on 600 g. of silica gel was mixed with 8 g. of quartz sand, and the mixture was filled in a reaction tube of 12 mm. inside diameter, and the reaction tube was maintained at 300° C. A gas mixture consisting of styrene, hydrogen cyanide, oxygen and nitrogen at a volume of 1:1:1:1 was introduced at a flow rate of 100 NTP ml./min. The yield of phenylacrylonitrile was 8.8%, based on the introduced styrene, over one hour from the starting of reaction. The reaction was continued until the yield of phenylacrylonitrile was reduced to 6.5% over 50 hours from the starting of reaction, and the introduction of styrene and hydrogen cyanide was stopped, and a gas mixture consisting of oxygen and nitrogen at a volume ratio of 1:1 was introduced into the reaction tube at a flow rate of 50 NTP ml./min. for 10 hours. Then, a gas mixture of the same composition as above-described was introduced in the same manner as above-described, and the yield of phenylacryonitrile was 8.8%.

EXAMPLE 14

2 g. of the catalyst prepared by supporting 0.1 gram-mole of calcium chloride and 0.1 gram-mole of palladium chloride on 500 g. of active carbon by the immersion method was filled into a reaction tube of 10 mm. inside diameter and the reaction tube was maintained at 250° C. A gas mixture consisting of styrene, hydrogen cyanide, oxygen, hydrogen chloride and nitrogen at a volume ratio of 1:2:1:1:1 was introduced in the reaction tube at a flow rate of 100 NTP ml./min. The yield of phenylacrylonitrile was 11.8%, based on the introduced styrene over 30 minutes after the starting of reaction, and 11.7% over 5 hours after the starting of reaction.

EXAMPLE 15

Using a catalyst prepared by supporting 0.2 gram-mole of cupric chloride and 0.1 gram-mole of palladium chloride on 600 g. of silica gel by the immersion method, the reaction was carried out in the same manner as in Example 9. The yield of phenylacrylonitrile was 13.6%, based on the introduced styrene.

EXAMPLE 16

Using a catalyst prepared by supporting 0.2 gram-mole of cerium chloride and 0.1 gram-mole of palladium chloride on 600 g. of silica gel by the immersion method, the reaction was carried out in the same manner as in Example 1. The yields of phenylacrylonitrile were 20.2% and 15.3%, based on the introduced styrene, over 30 minutes and over 50 hours after the starting of reaction, respectively.

Over 50 hours after the starting of reaction, the temperature was raised to 350° C., and the introduction of styrene and hydrogen cyanide was stopped, and a gas mixture consisting of oxygen, nitrogen and hydrogen chloride at a volume ratio of 5:34:1 was introduced at a flow rate of 50 NTP ml./min. for 5 hours. Then the reaction was reopened under the same conditions as in Example 1, and the yield of phenylacrylonitrile was 20.2%, based on the introduced styrene, over 30 minutes after the starting of reaction.

EXAMPLE 17

The reaction was carried out in the same manner as in Example 9 using a catalyst prepared by supporting 0.1 gram-molecule of molybdenum chloride and 0.2 gram-mole of palladium chloride on 100 g. of silica-alumina. The yield of phenylacrylonitrile was 12.2%, based on the introduced styrene.

EXAMPLE 18

2 g. of the catalyst prepared by supporting 0.5 gram-mole of sodium chloride, 0.1 gram-mole of thallium chloride and 0.1 gram-mole of palladium chloride on 600 g. of silica gel by the immersion method was filled into a reaction tube of 10 mm. inside diameter, and the reaction tube was placed in a niter bath maintained at 300° C. A gas mixture consisting of divinylbenzene, hydrogen cyanide, oxygen and nitrogen at a volume ratio of 3:1:1:5 was introduced into the reaction tube at a flow rate of 100 NTP ml./min. The yields of monocyanodiethynylbenzene and dicyanodiethynylbenzene were 9.2% and 1.5%, based on the introduced divinylbenzene, respectively.

EXAMPLE 19

2 g. of the catalyst prepared by supporting 0.2 gram-mole of potassium chloride, 0.1 gram-mole of bismuth chloride, 0.1 gram-mole of cadmium chloride and 0.1 gram-mole of palladium chloride on 500 g. of active carbon was mixed with 4 g. of quartz sand, and the mixture was filled into a reaction tube of 12 mm. inside diameter, and the reaction tube was maintained at 280° C. A gas mixture consisting of styrene, hydrogen cyanide, oxygen, hydrogen chloride and nitrogen at a volume ratio of 3:1:1:1:4 was introduced at a flow rate of 100 NTP ml./min. The yield of phenylacrylonitrile was 21.3%, based on the introduced styrene, both over 30 minutes and over 5 hours after the starting of reaction.

EXAMPLE 20

An aqueous hydrochloric acid solution containing 5.6 g. of rhodium chloride was mixed with 60 g. of silica gel, and the mixture was evaporated to dryness on a hot water bath. 10 g. of this catalyst was mixed with 10 g. of quartz sand, and the mixture was filled in a reaction tube of hard glass. The reaction tube was placed in a niter bath maintained at 400° C., and hydrogen was introduced into the reaction tube to reduce the rhodium chloride to metallic rhodium until hydrogen chloride ceased to come out from the outlet. Then, a gas mixture consisting of styrene, hydrogen cyanide, oxygen and nitrogen at a volume ratio of 2:1:1:6 was introduced into the reaction tube at 350° C. at a flow rate of 50 NTP ml./min. The yield of phenylacrylonitrile was 6.3%, based on the introduced styrene.

EXAMPLE 21

1 g. of the catalyst prepared by supporting 0.05 gram-mole of ferric chloride, 0.05 gram-mole of cadium chloride, 0.2 gram-mole of sodium chloride and 0.1 gram-mole of palladium chloride on 500 g. of active carbon was mixed with 2 g. of quartz sand and the mixture was filled in a reaction tube of 10 mm. inside diameter and the reaction tube maintained at 300° C. A gas mixture consisting of styrene, hydrogen, cyanide, oxygen, hydrogen chloride and nitrogen at a volume ratio of 5:10:3:2:10 was introduced a flow rate of 100 NTP ml./min. The yield of phenylacrylonitrile was 17.3%, based on the introduced styrene, both over 30 minutes and over 10 hours after the starting of reaction.

EXAMPLE 22

2 g. of the catalyst prepared by supporting 0.1 gram-mole of palladium chloride and 0.2 gram-mole of cesium chloride on 600 g. of silica gel was mixed with 4 g. of quartz sand, and the mixture was filled in a reaction tube of hard glass of 10 mm. inside diameter, and the reaction tube was placed in a niter bath maintained at 400° C. A gas mixture consisting of styrene, hydrogen cyanide, oxygen, $\alpha$-chloro-$\beta$-cyanoethylbenzene and nitrogen at a volume ratio of 1:1:1:2:4 was introduced at a flow rate of 100 NTP ml./min. The yield of phenylacrylonitrile was 23.2%, based on the introduced styrene.

EXAMPLE 23

Examples in which were used catalysts prepared from palladium compounds and other metal compounds, are shown in Table I.

TABLE I

| Example No. | Catalyst [1] | Carrier | Temperature (° C.) | Space velocity (hr.⁻¹) | Styrene | Hydrogen cyanide | Oxygen | Hydrogen halide | Nitrogen | Others | Phenylacrylonitrile yield [2] |
|---|---|---|---|---|---|---|---|---|---|---|---|
| 23 | Palladium cyanide (0.1), sodium cyanide (0.2). | Silica gel | 300 | 500 | 5 | 5 | 1 | 0 | 30 | | 15.7 |
| 24 | Palladium (0.1), rubidium chloride (0.2). | Alumina | 400 | 1,000 | 10 | 5 | 5 | HCl, 1 | | He, 30 | 19.2 |
| 25 | Palladium iodide (0.1), strontium chloride (0.1). | Active carbon. | 220 | 12,000 | 2 | 1 | 1 | HCl, 1 | 5 | | 10.2 |
| 26 | Palladium chloride (0.2), indium chloride (0.1). | Alumina | 250 | 1,000 | 5 | 5 | 5 | HBr, 1 | 4 | $H_2O$, 2 | 7.6 |
| 27 | Palladium nitrate (0.1), bismuth nitrate (0.1). | Silica gel | 300 | 500 | 5 | 10 | 2 | HCl, 5 | 28 | | 21.7 |
| 28 | Palladium monochloroacetate (0.2). | Silica gel | 250 | 1,500 | 5 | 5 | 5 | HBr, 1 | 5 | $CO_2$, 5 | 14.2 |
| 29 | Palladium sulfate (0.1), ferric chloride (0.1). | Silica gel | 250 | 1,500 | 10 | 10 | 2 | HCl, 3 | 15 | $CH_4$, 2 | 14.8 |
| 30 | Palladium chloride (0.1), cobalt bromide (0.1). | Active carbon. | 380 | 3,000 | 2 | 1 | 1 | 0 | 1 | | 10.3 |
| 31 | Palladium chloride (0.1) potassium bromide (0.2). | Silica gel | 280 | 500 | 1 | 2 | 1 | HCl, 1 | 5 | | 25.5 |
| 32 | Palladium bromide (0.1), sodium dihydrogenphosphate (0.2), bismuth chloride (0.1). | Active carbon. | 250 | 1,000 | 3 | 1 | 1 | HCl, 1 | 4 | | 19.5 |
| 33 | Palladium iodide (0.1), potassium carbonate (0.2). | Silica gel | 300 | 800 | 1 | 1 | 1 | HCl, 1 | | $CO_2$, 5 | 21.1 |
| 34 | Palladium chloride (0.1), sodium acetate (0.2). | Silica gel | 300 | 500 | 1 | 2 | 1 | HCl, 1 | 1 | | 28.4 |
| 35 | Palladium acetate (0.1), potassium bromate (0.2). | Silica gel | 450 | 1,000 | 2 | 2 | 1 | 0 | 5 | | 13.2 |
| 36 | Palladium chloride (0.1), nickel chloride (0.05), potassium iodide (0.2), thallium chloride (0.1). | Alumina | 300 | 1,000 | 5 | 5 | 2 | HI, 1 | 35 | | 15.7 |
| 37 | Palladium chloride (0.1), thorium chloride (0.2). | Silica gel | 250 | 1,500 | 1 | 2 | 1 | HCl, 2 | 4 | | 29.2 |
| 38 | Palladium chloride (0.1), potassium thiocyanate (0.5), copper sulfate (0.01). | Active carbon. | 400 | 500 | 2 | 1 | 1 | 0 | 5 | | 10.3 |
| 39 | Palladium oxalate (0.1), sodium selenite (0.2). | Silica gel | 330 | 300 | 2 | 1 | 2 | CHI, 5 | 5 | | 20.9 |
| 40 | Palladium oxide (0.1), cadmium oxide (0.1). | Silica gel | 300 | 1,000 | 2 | 1 | 1 | 0 | 2 | | 8.4 |

[1] The figure in parentheses represents gram-mole of a catalyst supported on 500 g. of a carrier.
[2] Yield based on the introduced styrene.

EXAMPLE 41

2 g. of the catalyst prepared by supporting 0.2 gram-mole of palladium chloride and 0.4 gram molecule of potassium chloride on 500 g. of silica gel was mixed with 4 g. of quartz sand, and the mixture was filled in a reaction tube of heat-resistant glass of 15 mm. inside diameter, and the reaction tube was maintained at 280° C. Into the reaction tube, a gas mixture consisting of $\alpha$-methylstyrene, hydrogen cyanide, air and hydrogen chloride at a volume ratio of 1:1:5:1 was introduced at a flow rate of 100 NTP ml./min. The yield of $\alpha$-methylcinnamonitrile was 22.5%, based on the introduced $\alpha$-methylstyrene.

EXAMPLE 42

4 g. of the catalyst prepared by supporting 0.8 gram-mole palladium chloride, 0.2 gram-mole of cesium chloride and 0.1 gram-mole of chloroplatinic ocid on 1000 g. of silica gel was mixed with 4 g. of quartz sand, and the mixture was filled into a reaction tube of heat-resistant glass of 10 mm. inside diameter, and the reaction tube was maintained at 300° C. Into the reaction tube, a gas mixture consisting of styrene, hydrogen cyanide, air and hydrogen chloride at a volume ratio of 1:2:5:2 was introduced at a flow rate of 50 NTP ml./min. The yield of phenylacrylonitrile was 36.1%, based on the introduced styrene.

EXAMPLE 43

5 g. of the catalyst prepared by supporting 0.2 gram-mole of palladium chloride and 0.2 gram-mole of ammonium tungstate on 500 g. of silica gel and treating the resulting product with hydrogen sulfide for 10 hours at 350° C. was filled in a reaction tube of heat resistant glass of 10 mm. inside diameter, and the reaction tube was maintained at 350° C. Into this reaction tube, a gas mixture consisting of styrene, hydrogen cyanide, air and hydrogen chloride at a volume ratio of 1:1:5:1 was introduced at a flow rate of 50 NTP ml./min. The yield of phenylacrylonitrile was 12.6%, based on the introduced styrene, over 10 hours after the starting of reaction and 12.1% over 200 hours after the starting of reaction.

EXAMPLE 44

4 g. of the catalyst prepared by supporting 0.2 gram-mole of palladium chloride and 0.4 gram-mole of cesium chloride on 500 g. of silica gel was mixed with 4 g. of quartz sand, and the mixture was filled in a reaction tube of heat-resistant glass of 15 mm. inside diameter, and the reaction tube was maintained at 300° C. Into this reaction tube, a gas mixture consisting of styrene, hydrogen cyanide, oxygen, hydrogen chloride and nitrogen at a volume ratio of 5:5:5:3:12 was introduced at a flow rate of 50 NTP ml./min. The yield of phenylacrylonitrile was 77.9%, based on the introduced styrene.

What is claimed is:

1. A process for the production of phenylacrylonitriles of the formula:

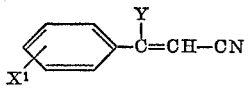

wherein $X^1$ represents a member selected from the group consisting of hydrogen atom, chlorine atom, cyano group, vinyl group and —CH=CH—CN group and Y represents a member selected from the group consisting of hydrogen atom and methyl group which comprises subjecting a gas mixture containing one member selected from the group consisting of styrene and derivatives thereof of the formula:

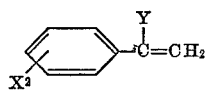

wherein $X^2$ represents a member selected from the group consisting of hydrogen atom, chlorine atom, cyano group and vinyl group; and Y is the same as defined above, hydrogen cyanide and a gas selected from the group consisting of oxygen and molecular oxygen-containing gases to a catalytic reaction at a temperature of from 100° to 500° C. in the presence of, as catalyst, a member selected from the group consisting of palladium, rhodium, halides, cyanides, oxides, hydroxides, sulfides, thiocyanates, carboxylates, sulfates, nitrates and phosphates of palladium or of rhodium.

2. The process of claim 1 wherein the reaction is effected in the presence of at least one compound selected from the group consisting of hydrogen chloride, hydrogen bromide, hydrogen iodide, α-chloro-β-cyanoethylbenzene and β-chloroethylbenzene.

3. The process of claim 2 wherein the volume ratio of the compound to hydrogen cyanide is in the range of 20–1/100:1.

4. The process of claim 1 wherein the catalyst is used after treatment with hydrogen sulfide at a temperature of from 200° to 600° C.

5. The process of claim 1 wherein the catalyst used is one whose activity has been lowered in previous use and which has been regenerated by heating it at a temperature of from 200° to 600° C. in a steam of at least one gas selected from the group consisting of oxygen, molecular oxygen-containing gases, hydrogen chloride, hydrogen bromide and hydrogen iodide.

6. The process of claim 1 wherein the reaction is effected in the presence of an inert gas selected from the group consisting of helium, nitrogen, carbon dioxide, carbon monoxide, methane, ethane and steam.

7. The process of claim 1 wherein the catalyst is supported on a carrier selected from the group consisting of silica gel, active carbon, alumina, silica-alumina, alumina-boria and molecular sieve.

References Cited

UNITED STATES PATENTS

| | | | |
|---|---|---|---|
| 2,455,995 | 12/1948 | Harris et al. | 260—465 X |
| 2,734,909 | 2/1956 | Gee et al. | 260—465 X |
| 2,770,642 | 11/1956 | Montgomery | 260—465 |
| 3,358,016 | 12/1967 | Kohll et al. | 260—453 |

CHARLES B. PARKER, Primary Examiner

D. H. TORRENCE, Assistant Examiner

U.S. Cl. X.R.

252—411, 415, 431, 437, 439, 441, 460, 472; 260—88.7